D. A. MATTHEWS.
AUTOMATIC BRAKE.
APPLICATION FILED MAR. 15, 1913.
1,089,242.
Patented Mar. 3, 1914.
2 SHEETS—SHEET 1.
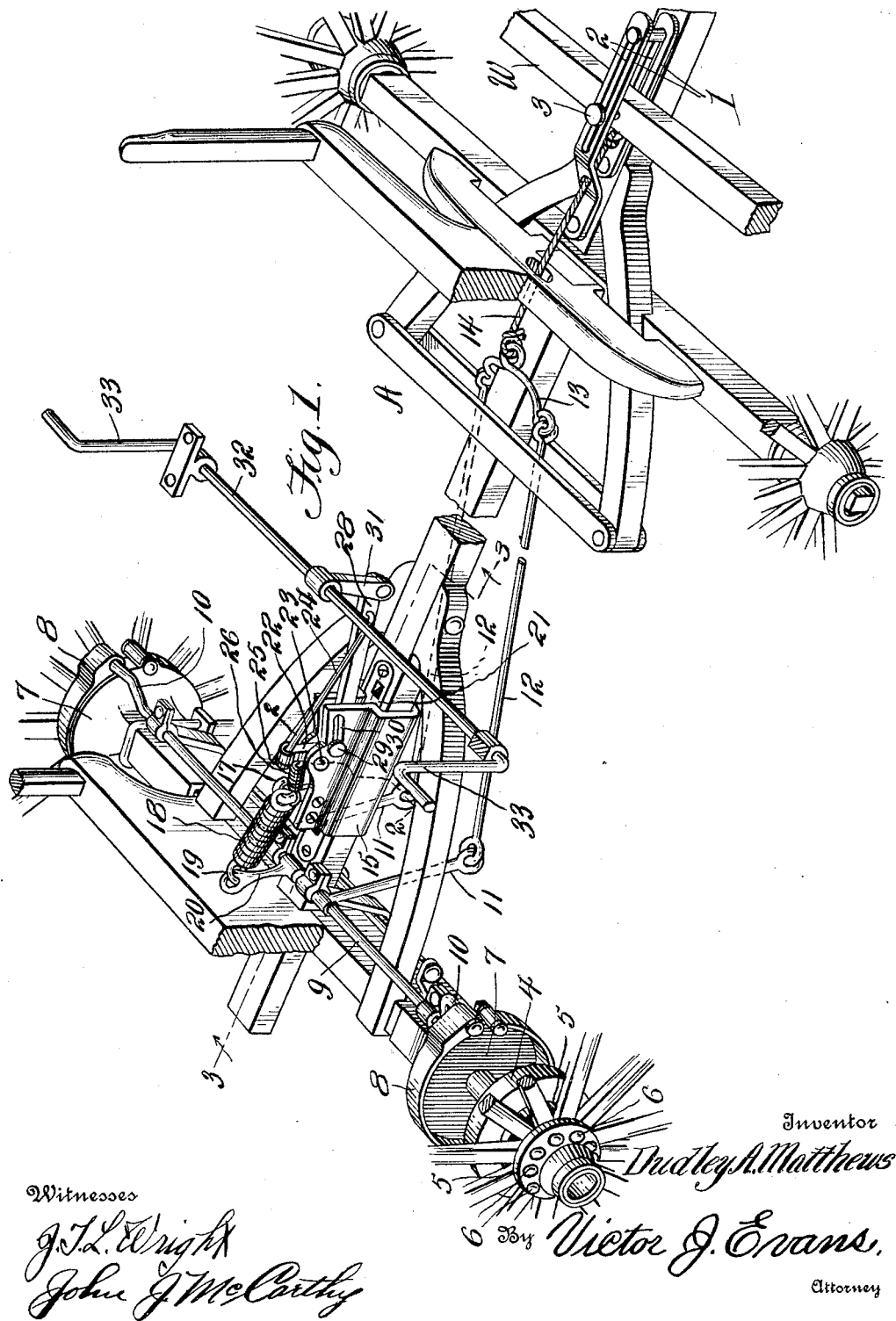

D. A. MATTHEWS.
AUTOMATIC BRAKE.
APPLICATION FILED MAR. 15, 1913.
1,089,242.
Patented Mar. 3, 1914.
2 SHEETS—SHEET 2.
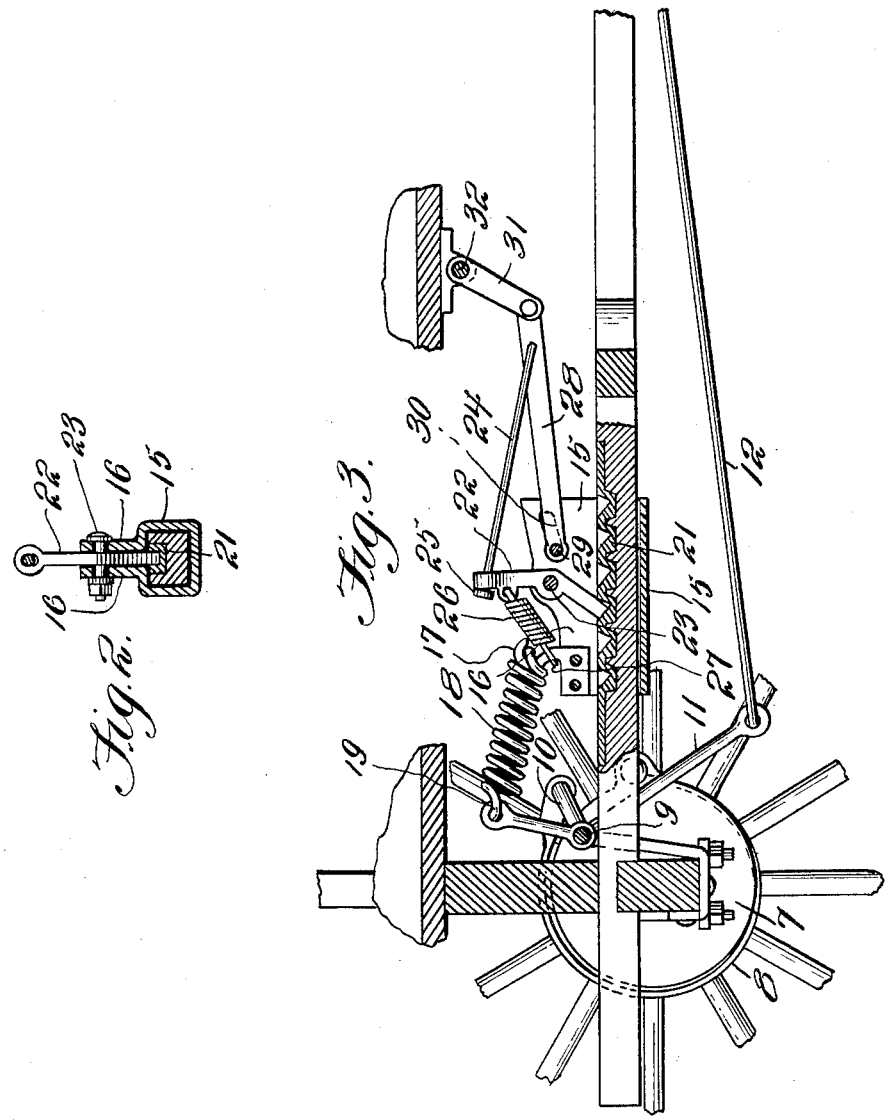
Witnesses
G. L. Wright
John J. McCarthy
Inventor
Dudley A. Matthews,
By Victor J. Evans
Attorney

UNITED STATES PATENT OFFICE.

DUDLEY A. MATTHEWS, OF GARDEN VALLEY, TEXAS.

AUTOMATIC BRAKE.

1,089,242. Specification of Letters Patent. Patented Mar. 3, 1914.

Application filed March 15, 1913. Serial No. 754,410.

*To all whom it may concern:*

Be it known that I, DUDLEY A. MATTHEWS, a citizen of the United States, residing at Garden Valley, in the county of Smith and State of Texas, have invented new and useful Improvements in Automatic Brakes, of which the following is a specification.

This invention relates to improvements in automatic brakes and has particular application to an automatic wagon brake whereby when the vehicle is descending an incline the brakes will be automatically applied to the wheels so as to remove any strain from the draft animals incident to the wagon or other vehicle tending to creep upon such animals.

In carrying out the present invention, it is my purpose to provide an automatic brake of the class set forth which will operate automatically to retard the descent of a vehicle on an incline and whereby the braking action may be increased manually in the event of the wagon or other vehicle being heavily laden and descending a steep gradient.

It is also my purpose to provide a braking apparatus of the type set forth which will embrace the desired features of simplicity, efficiency, durability and strength coupled with cheapness of cost in manufacture and marketing and which will be entirely automatic in operations when normal conditions prevail.

With the above and other objects in view, the invention consists in the construction, combination and arrangement of parts hereinafter set forth in and falling within the scope of the claims.

In the accompanying drawings; Figure 1 is a perspective view of a vehicle running gear showing my invention as applied thereto, parts being broken away and one of the wheel hubs partly removed from the spindle. Fig. 2 is a cross sectional view on the line 2—2 of Fig. 1, and Fig. 3 is a fragmentary longitudinal sectional view through the running gear.

Referring now to the accompanying drawings in detail, A indicates the running gear of a vehicle constructed in some suitable manner and provided, in the present instance, with a pole or tongue carrying a whiffle or double tree to accommodate a pair of draft animals such, for instance, as horses. This whiffle tree is mounted for sliding movement upon the pole and is disposed between metallic plates or strips 1, 1 having alining elongated slots 2 therein designed to receive the vertical pin 3 carried by the whiffle tree so as to hold the whiffle tree in proper position upon the pole or tongue and enable the same to slide longitudinally therealong. In the present instance, the rear wheels of the vehicle are provided with hub brakes of the band type each composed, in this instance, of a disk 4 constructed of some suitable material and fastened to the wheel hub upon the inner side of the respective wheel by means of collars 5, 5 disposed at the opposite sides of the wheel and secured to each other through the medium of bolts 6 passed through the spaces between the spokes, the collar upon the inner side of the wheel being bolted or otherwise fastened to the disk 4, and an annular plate 7 suitably secured to the respective end of the axle and disposed concentrically of the axle spindle and carrying an expanding band 8 disposed about the periphery of the disk 4 and having one end suitably fastened to the plate 7, such band being capable of contraction and expansion so as to hold the wheels against movement and permit the same to rotate freely about the spindle, respectively, the disk and plate being placed in face to face contact so that the band 8 will embrace the periphery of the disk 4.

Arranged longitudinally of the rear axle and transversely of the reach bar of the running gear is a shaft 9 journaled in suitable bearings and having the opposite end portions thereof offset to form cranks 10, 10 each suitably secured to the free end of the respective band 8 so that when the shaft is rotated in one direction the band will be expanded to relieve the wheels of the influence of the brakes, while when an opposite motion is imparted to the shaft the band will be contracted to apply the brakes to the wheels.

Depending from the crank shaft 9 and preferably formed integral therewith at opposite sides of the reach bar of the running gear are rods 11, 11 to each of which is suitably fastened a link 12, such links having the free ends thereof connected to the opposite limbs of a yoke 13 spanning the reach bar adjacent to the forward axle of the vehicle and connected by means of a cord, rope, cable or the like 14 with the sliding whiffle tree W.

From this construction, it will be seen that when the draft animals are exerting a pull upon the whiffle tree W, the flexible element 14 will be placed under tension with the effect to slide the yoke 13 forwardly along the reach bar and impart a turning movement to the reach bar through the medium of the links 12, 12 and the rods 11, 11 thereby expanding the bands 8, 8 so that the wheels may be rotated freely.

In order that the brakes will be automatically applied to the wheels, as when the vehicle is descending an incline or grading so that the draft animals will be relieved of the weight of the vehicle, I mount upon the reach bar of the running gear a bracket 15 formed, in the present instance, of a single sheet of metal bent to embrace the reach bar and slidably mounted thereon and having the end portions thereof bent upwardly as at 16, 16 and spaced apart to receive a hook 17 suitably bolted to such end portions and receiving one end of a coiled contractile spring 18, the free end of the spring being connected as at 19 to a hook 20 formed integral with and upstanding from the shaft 9. Thus, when the crank shaft 9 is relieved of the influence of the links 12, 12 and the whiffle tree, as when the vehicle is descending a gradient, it will be seen that the spring 18 will act upon the crank shaft, through the medium of the hook 20 to rotate such shaft and contract the bands 8 so as to bring about a binding action between the bands of the peripheries of the disks 4 whereby the wheels will be subjected to a braking action, the vehicle retarded in its descent without subjecting the draft animals to any load or strain.

In some instances, particularly where the vehicle is heavily laden and descending a steep incline, it may be desired to increase the frictional contact between the bands 8, 8 and the disks 4, 4 of the brakes. For this purpose I secure to the upper surface of the reach bar of the running gear a rack 21 with the teeth of which meshes one end of a dog or pawl 22 fulcrumed between its ends upon a pin 23 spanning the space between the upstanding ends 16, 16 of the bracket 15, the opposite end of such dog or pawl being formed with an aperture through which is loosely passed a rod 24 having one end headed as at 25 and connected to one extremity of a contractile spring 26, the latter having the free end thereof fastened as at 27 to an appropriate part of the running gear. Slidably mounted within the bracket 15 between the upstanding end portions 16, 16 thereof is a forwardly extending bar 28 having pins 29, extending outwardly from the opposite sides thereof and disposed within slots 30 formed in the ends 16, 16 of the bracket and alining with each other, the free end of the rod 24 being connected to the bar 28, while to the free extremity of the bar is pivotally connected a lug 31 depending from a shaft 32 journaled in suitable bearings carried by the running gear on the bottom of a wagon body and arranged transversely in said running gear and terminating at one side of the vehicle in an operating handle 33.

From the foregoing description taken in connection with the accompanying drawings the construction, mode of operation and manner of employing my invention will be readily apparent. When a vehicle equipped with my present invention descends a gradient under ordinary conditions the spring 18 acts and automatically rotates the shaft 9 to contract the bands 8 and so apply the brakes to the wheels to retard the descent of the vehicle, while when the draft animals are pulling the vehicle on a level or ascending an incline, the cable 14, yoke 13, links 12, 12 and the rod 11 coöperate to rotate the shaft 9 in a direction opposite to the direction of rotation of such shaft under the action of the spring 18 and against such spring to expand the bands 8 and so relieve the disks 4, 4 of the influence of said bands, whereby the wheels are free to rotate. However, should the vehicle be heavily laden and descending a steep gradient so that the tension exerted by the spring 18 is insufficient to bring about the braking power necessary to remove the load or strain from the draft animals, the manually operable means is resorted to and the shaft 32 rotated under the action of the handle 33 thereby sliding the bar 28 forwardly, incident to the pin and slot connections between such bar and the bracket 15. In the initial forward movement of the bar 28, the headed end of the bar 24 contacts with the respective extremity of the dog 22 to swing the latter about its pivot and so disengage the dog from the teeth of the rack bar 21. In the further movement of the rod 24 and the bar 28, the dog is held out of engagement with the teeth of the rack bar and the bracket slid along the reach bar of the running gear with the effect to increase the tension of the spring 18 thereby contracting the bands 8 so that the maximum braking power is applied to the wheels. Upon the release of the handle 33, the spring 26 reacts and so throws the dog 22 into engagement with the adjacent tooth of the rack bar thereby holding the bracket in the desired position so as to eliminate the necessity of the operator holding the shaft 32.

While I have herein shown and described one preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In an automatic braking apparatus for vehicles, band brakes associated with the hubs of the rear wheels of the vehicle, a crank shaft disposed longitudinally of the rear axle of the vehicle and journaled upon the vehicle running gear, connections between said shaft and brakes whereby the latter may be moved to braking and non-braking positions, connections between said shaft and the draft appliance of the vehicle whereby the brakes will be held in non-braking position, a bracket slidably disposed upon the reach bar of the vehicle, tension means interposed between said bracket and shaft and acting to rotate the shaft to move the brakes into braking position, means normally holding said bracket against movement, and means for relieving said bracket of the influence of the last means and for subsequently sliding said bracket to increase the efficiency of said tension means.

2. In an automatic braking apparatus for wheeled vehicles, band brakes associated with the hubs of the rear wheels of the vehicle, a crank shaft disposed longitudinally of the rear axles of the vehicle and journaled upon the running gear thereof, connections between said crank shaft and brakes, connections between said shaft and the draft appliance of the vehicle whereby the brakes will be held in non-braking position, a bracket comprising a plate bent to inclose a portion of the reach rod of the vehicle and having the opposite ends thereof extending upwardly and spaced apart, a hook disposed between the confronting faces of said ends, a hook extending upwardly from said shaft, a spring having the opposite ends thereof secured to said hooks and normally acting to rotate the shaft to hold the brakes in braking position, a dog fulcrumed between its ends intermediate the ends of said plate, a bar slidably disposed between said plate and having pins projecting outwardly from the opposite sides thereof, the ends of said bracket being provided with alining slots to receive said pins, a rod passed loosely through the free end of said dog and connected to said bar, a rack bar connected to said reach rod and adapted to be engaged with said dog to hold the bracket in proper position, means for sliding said bar between the upstanding ends of said bracket to disengage the dog from the teeth of the rack and subsequently slide the bracket along the reach rod, and means for restoring said dog to normal position upon the release of the last-named means.

In testimony whereof I affix my signature in presence of two witnesses.

DUDLEY A. MATTHEWS.

Witnesses:
 EUGENE B. TUNNELL,
 GEORGE E. BROWNING.

Copies of this patent may be obtained for five cents each, by addressing the "Commissioner of Patents, Washington, D. C."